United States Patent
Johnson

(10) Patent No.: US 11,244,289 B2
(45) Date of Patent: Feb. 8, 2022

(54) METHODS AND SYSTEMS FOR MANAGING FINANCIAL INSTITUTION CUSTOMER ACCOUNTS

(75) Inventor: William Johnson, Marietta, GA (US)

(73) Assignee: CITICORP CREDIT SERVICES, INC. (USA), Sioux Falls, SD (US)

( * ) Notice: Subject to any disclaimer, the term of this patent is extended or adjusted under 35 U.S.C. 154(b) by 867 days.

(21) Appl. No.: 12/289,675

(22) Filed: Oct. 31, 2008

(65) Prior Publication Data
US 2009/0119211 A1 May 7, 2009

Related U.S. Application Data

(60) Provisional application No. 60/996,135, filed on Nov. 2, 2007.

(51) Int. Cl.
| | |
|---|---|
| G06Q 20/04 | (2012.01) |
| G06Q 20/10 | (2012.01) |
| G06Q 40/02 | (2012.01) |
| G06Q 20/20 | (2012.01) |
| G06Q 20/40 | (2012.01) |
| G06Q 20/22 | (2012.01) |

(52) U.S. Cl.
CPC .......... *G06Q 20/04* (2013.01); *G06Q 20/105* (2013.01); *G06Q 20/20* (2013.01); *G06Q 20/227* (2013.01); *G06Q 20/405* (2013.01); *G06Q 40/02* (2013.01)

(58) Field of Classification Search
CPC ......... G06Q 40/02; G06Q 40/08; G06Q 40/00
USPC ...... 235/487, 379, 493; 705/50, 44; 707/791
See application file for complete search history.

(56) References Cited

U.S. PATENT DOCUMENTS

| | | | | |
|---|---|---|---|---|
| 5,883,810 | A | * | 3/1999 | Franklin et al. .............. 700/232 |
| 5,984,191 | A | * | 11/1999 | Chapin, Jr. ...... G06K 19/06187 235/487 |
| 6,138,917 | A | * | 10/2000 | Chapin, Jr. ................... 235/487 |

(Continued)

OTHER PUBLICATIONS

John B. Frank, Pay by Touch, Oct. 2007, http://biometricpayments.blogspot.com/2007/10/what-is-merchant-acquirer.html (MAcquirer).*

(Continued)

*Primary Examiner* — Chikaodinaka Ojiaku
(74) *Attorney, Agent, or Firm* — Johnson, Marcou, Isaacs & Nix, LLC; George Marcou; Scott A. Hendrix

(57) ABSTRACT

A computer-implemented method and system for managing financial institution customer transaction accounts involves issuing a relationship presentment card with a relationship identifier unique to the customer that is linked to a plurality of the customer's financial institution transaction accounts via pre-defined parameters for determining to which of the customer's linked accounts to post particular transactions with the relationship presentment card. Thereafter, when data for a transaction with the card is received by a processing platform of the financial institution via a merchant acquirer and a card association processing network, the card processing platform of the financial institution identifies a particular financial institution account of the customer to which the transaction should be posted according to the pre-defined parameters based on the transaction data and posts the transaction to the identified financial institution account of the customer.

8 Claims, 2 Drawing Sheets

(56) References Cited

U.S. PATENT DOCUMENTS

| | | | | |
|---|---|---|---|---|
| 6,298,335 B1* | 10/2001 | Bernstein | | 705/40 |
| 6,339,766 B1* | 1/2002 | Gephart | | 705/44 |
| 6,422,462 B1* | 7/2002 | Cohen | | 235/381 |
| 6,732,919 B2* | 5/2004 | Macklin et al. | | 235/380 |
| 7,311,244 B1* | 12/2007 | Schwarz, Jr. | | 235/375 |
| 7,349,866 B2* | 3/2008 | Schwarz, Jr. | | 705/14 |
| 7,357,331 B2* | 4/2008 | Blossom | | 235/492 |
| 7,401,731 B1* | 7/2008 | Pletz et al. | | 235/380 |
| 7,591,416 B2* | 9/2009 | Blossom | | 235/380 |
| 7,805,335 B2* | 9/2010 | Wittmer | G06Q 30/0603 | 705/26.1 |
| 7,856,399 B2* | 12/2010 | Wilkes | G06Q 20/10 | 705/39 |
| 7,860,789 B2* | 12/2010 | Hirka | G06Q 20/105 | 705/39 |
| 7,878,394 B2* | 2/2011 | Johnson | G06Q 20/401 | 235/380 |
| 8,046,273 B2* | 10/2011 | Welter | G06Q 30/0637 | 705/26.8 |
| 8,117,100 B1* | 2/2012 | Hopkins | G06Q 20/385 | 705/34 |
| 8,191,766 B2* | 6/2012 | Tomchek | G06Q 40/12 | 235/376 |
| 8,249,961 B1* | 8/2012 | Hopkins | G06Q 20/385 | 705/34 |
| 8,412,604 B1* | 4/2013 | Graham | G06Q 30/0204 | 705/35 |
| 8,509,814 B1* | 8/2013 | Parker | H04M 3/42348 | 455/456.3 |
| 8,700,525 B1* | 4/2014 | Rafferty | G06Q 20/023 | 705/39 |
| 8,788,414 B2* | 7/2014 | Sorbe | G06Q 20/108 | 705/40 |
| 9,213,965 B1* | 12/2015 | Brooks | G06Q 20/085 | |
| 9,251,511 B2* | 2/2016 | Sorbe | G06Q 40/00 | |
| 9,747,637 B1* | 8/2017 | Kalaboukis | H04W 4/02 | |
| 10,037,554 B2* | 7/2018 | Prokopenko | G06Q 30/04 | |
| 10,318,980 B2* | 6/2019 | Crowe | G06Q 30/0226 | |
| 10,515,405 B2* | 12/2019 | Sorbe | G06Q 40/00 | |
| 11,089,141 B2* | 8/2021 | Albero | H04L 69/329 | |
| 2002/0062249 A1* | 5/2002 | Iannacci | G06Q 20/105 | 705/14.1 |
| 2003/0061157 A1* | 3/2003 | Hirka | G07F 7/025 | 705/39 |
| 2003/0101131 A1* | 5/2003 | Warren | G06Q 40/025 | 705/38 |
| 2003/0139971 A1* | 7/2003 | Rescigno | G06Q 30/0637 | 705/26.62 |
| 2003/0172040 A1* | 9/2003 | Kemper | G06Q 20/403 | 705/75 |
| 2005/0097039 A1* | 5/2005 | Kulcsar | G06Q 40/00 | 705/40 |
| 2005/0109838 A1* | 5/2005 | Linlor | G06Q 20/04 | 235/380 |
| 2005/0114155 A1* | 5/2005 | Hodges | H04L 12/14 | 705/35 |
| 2005/0121513 A1* | 6/2005 | Drummond | G06Q 20/102 | 235/381 |
| 2006/0085334 A1* | 4/2006 | Murphy | G06Q 40/02 | 705/40 |
| 2006/0106696 A1* | 5/2006 | Carlson | G06Q 20/04 | 705/35 |
| 2006/0116903 A1* | 6/2006 | Becerra | G06Q 40/08 | 705/2 |
| 2006/0116955 A1* | 6/2006 | Strayer | G06Q 20/4037 | 705/39 |
| 2006/0122918 A1* | 6/2006 | Graboske | G06Q 50/16 | 705/30 |
| 2006/0131869 A1* | 6/2006 | Brignull | B42D 25/28 | 283/74 |
| 2006/0149671 A1* | 7/2006 | Nix | G06Q 20/40 | 705/40 |
| 2006/0157557 A1* | 7/2006 | Lee | G06Q 20/341 | 235/380 |
| 2006/0208065 A1* | 9/2006 | Mendelovich | G06Q 30/02 | 235/380 |
| 2006/0224480 A1* | 10/2006 | Bent | G06Q 40/00 | 705/35 |
| 2006/0242057 A1* | 10/2006 | Velarde | G06Q 40/02 | 705/38 |
| 2006/0249574 A1* | 11/2006 | Brown | G06K 19/06187 | 235/380 |
| 2006/0251478 A1* | 11/2006 | Desmeules | E02D 7/22 | 405/232 |
| 2006/0259364 A1* | 11/2006 | Strock | G06Q 30/0216 | 705/14.15 |
| 2006/0259390 A1* | 11/2006 | Rosenberger | G06Q 20/20 | 705/35 |
| 2006/0261927 A1* | 11/2006 | Kelly | G06K 7/0008 | 340/10.1 |
| 2006/0289636 A1* | 12/2006 | Hoblit | G06Q 20/363 | 235/383 |
| 2007/0020443 A1* | 1/2007 | Lo | B32B 3/00 | 428/195.1 |
| 2007/0034700 A1* | 2/2007 | Poidomani | G06K 19/0702 | 235/492 |
| 2007/0063025 A1* | 3/2007 | Blossom | G06K 19/06206 | 235/380 |
| 2007/0078719 A1* | 4/2007 | Schmitt | G06Q 30/0224 | 705/14.25 |
| 2007/0118470 A1* | 5/2007 | Warren | G06Q 40/025 | 705/38 |
| 2007/0136211 A1* | 6/2007 | Brown | G06Q 20/385 | 705/75 |
| 2007/0156530 A1* | 7/2007 | Schmitt | G06Q 30/0215 | 705/14.17 |
| 2007/0203825 A1* | 8/2007 | Hanifin | G06Q 40/06 | 705/38 |
| 2007/0208671 A1* | 9/2007 | Brown | G07F 7/1083 | 705/65 |
| 2007/0215688 A1* | 9/2007 | Routhenstein | G06Q 20/3823 | 235/379 |
| 2007/0252002 A1* | 11/2007 | Guillot | G06Q 20/12 | 235/380 |
| 2007/0265924 A1* | 11/2007 | Schwarz, Jr. | G06Q 30/0279 | 705/14.17 |
| 2008/0005018 A1* | 1/2008 | Powell | G06Q 30/02 | 705/39 |
| 2008/0010202 A1* | 1/2008 | Schwarz, Jr. | G06Q 40/00 | 705/41 |
| 2008/0027841 A1* | 1/2008 | Eder | G06Q 40/00 | 705/35 |
| 2008/0065445 A1* | 3/2008 | Livesay | G06Q 40/04 | 705/35 |
| 2008/0077506 A1* | 3/2008 | Rampell | G06Q 30/06 | 705/26.1 |
| 2008/0077514 A1* | 3/2008 | Hart | G06Q 40/00 | 705/35 |
| 2008/0082418 A1* | 4/2008 | Fordyce | G06Q 30/0207 | 705/14.34 |
| 2008/0099551 A1* | 5/2008 | Harper | G06Q 20/342 | 235/380 |
| 2008/0120234 A1* | 5/2008 | Jagatic | G06Q 20/40 | 705/44 |
| 2008/0162278 A1* | 7/2008 | Hershkovitz | G06Q 30/0269 | 705/14.66 |
| 2008/0162279 A1* | 7/2008 | Hershkovitz | G06Q 30/0601 | 705/14.51 |
| 2008/0162297 A1* | 7/2008 | Hershkovitz | G06Q 30/0635 | 705/26.81 |
| 2008/0177659 A1* | 7/2008 | Lacey | G06Q 40/00 | 705/42 |
| 2008/0187770 A1* | 8/2008 | Funicelli | B44C 1/1737 | 428/457 |
| 2008/0222038 A1* | 9/2008 | Eden | G06Q 20/20 | 705/44 |
| 2008/0230600 A1* | 9/2008 | Black | G06Q 20/20 | 235/380 |

(56) References Cited

U.S. PATENT DOCUMENTS

| | | | | |
|---|---|---|---|---|
| 2008/0245865 A1* | 10/2008 | Mosteller | ............. | B42D 25/351 235/449 |
| 2008/0277465 A1* | 11/2008 | Pletz | ...................... | G06Q 30/02 235/379 |
| 2008/0301041 A1* | 12/2008 | Bruk | ................... | G06Q 20/227 705/39 |
| 2009/0043651 A1* | 2/2009 | Schwarz, Jr. | ....... | G06Q 30/0215 705/14.27 |
| 2009/0048972 A1* | 2/2009 | Bierer | ................... | G06Q 20/10 705/44 |
| 2009/0070260 A1* | 3/2009 | Flitcroft | ............... | G06Q 20/342 705/41 |
| 2009/0119204 A1* | 5/2009 | Akella | ................. | G06Q 20/357 705/39 |
| 2009/0150370 A1* | 6/2009 | Christensen | ........... | G06Q 10/10 |
| 2009/0157519 A1* | 6/2009 | Bishop | ................... | G06Q 20/02 705/19 |
| 2009/0230195 A1* | 9/2009 | Lasch | ................. | B42D 25/373 235/488 |
| 2009/0240620 A1* | 9/2009 | Kendrick | ........... | G06Q 20/3821 705/39 |
| 2009/0242645 A1* | 10/2009 | Komatsu | .......... | G06K 19/07749 235/488 |
| 2009/0250522 A1* | 10/2009 | Williams | ............... | H05K 3/046 235/492 |
| 2009/0261161 A1* | 10/2009 | Blossom | ............ | G06K 19/0719 235/380 |
| 2009/0265275 A1* | 10/2009 | Everhart | ................ | G06Q 20/40 705/44 |
| 2009/0271853 A1* | 10/2009 | Everhart | ............ | G06Q 20/0855 726/6 |
| 2010/0030675 A1* | 2/2010 | Hanan | ..................... | G06Q 30/04 705/34 |
| 2010/0030697 A1* | 2/2010 | Goodrich | ............... | G06Q 40/00 705/75 |
| 2010/0179888 A1* | 7/2010 | Warren | ................. | G06Q 99/00 705/26.1 |
| 2010/0264227 A1* | 10/2010 | Joyce | ................... | G06K 19/077 235/493 |
| 2011/0125633 A1* | 5/2011 | Aaltonen | ............... | G06Q 20/10 705/39 |
| 2011/0320358 A1* | 12/2011 | Harris | .................. | G06Q 20/042 705/45 |
| 2013/0013676 A1* | 1/2013 | Blair | .................. | G06Q 20/1235 709/203 |
| 2015/0081365 A1* | 3/2015 | Akita | ............. | G06Q 10/063114 705/7.15 |
| 2016/0314451 A1* | 10/2016 | Martin | ................. | G06Q 20/405 |
| 2016/0314465 A1* | 10/2016 | Martin | ................... | G06Q 20/20 |
| 2016/0314487 A1* | 10/2016 | Martin | ............... | G06Q 30/0239 |

OTHER PUBLICATIONS

A. M. Fairchild, "Value positions for financial institutions in electronic bill presentment and payment (EBPP)," 36th Annual Hawaii International Conference on System Sciences, 2003. Proceedings of the, Big Island, HI, USA, 2003, pp. 10 pp.-, (Value Position) (Year: 2003).*

A. M. Fairchild, "Value positions for financial institutions in electronic bill presentment and payment (EBPP)," 36th Annual Hawaii International Conference on System Sciences, 2003. Proceedings of the, 2003, pp. 10 pp.-, doi: 10.1109/HICSS.2003.1174448. (Value Positions). (Year: 2003).*

Sangjo Oh, "A Stakeholder Perspective on Successful Electronic Payment Systems Diffusion," Proceedings of the 39th Annual Hawaii International Conference on System Sciences (HICSS'06), 2006, pp. 186b-186b, doi: 10.1109/HICSS.2006.31. (Payment). (Year: 2006).*

A. M. Fairchild, "Value positions for financial institutions in electronic bill presentment and payment (EBPP)," 36th Annual Hawaii International Conference on System Sciences, 2003. Proceedings of the, 2003, pp. 10 pp.-, doi: 10.1109/HICSS.2003.1174448 (Value Propositions). (Year: 2003).*

"MasterCard Launches Product Graduation" (Summary) [online], Jun. 18, 2007 [retrieved on Apr. 28, 2009], 1 p., Retrieved from the Internet: http://www.cards2007.com/jun/18/product-graduation.

"MasterCard to Enable Cardholders to Keep Account Numbers When Switching Card Programs" [online], Jun. 18, 2007 [retrieved on Apr. 28, 2009], *WebWire*, 2 pp., Retrieved from the Internet: http://www.webwire.com/ViewPressRel.asp?aId=39697.

Mexican Office Action dated Dec. 7, 2011 for counterpart Mexican Patent Application No. MX/a/2008/014010, pp. 1-4.

Mexican Office Action dated Jun. 20, 2012 for counterpart Mexican Patent Application No. MX/a/2008/014010, pp. 1-2.

\* cited by examiner

METHODS AND SYSTEMS FOR MANAGING FINANCIAL INSTITUTION CUSTOMER ACCOUNTS

PRIORITY APPLICATION

This application claims the benefit of U.S. Provisional Application No. 60/996,135 filed Nov. 2, 2007, entitled "METHODS AND SYSTEMS FOR MANAGING FINANCIAL INSTITUTION CUSTOMER ACCOUNTS", which is incorporated herein by this reference.

FIELD OF THE INVENTION

The present invention relates generally to the field of managing financial institution customer transaction accounts, and more particularly to methods and systems for routing and posting customer transactions performed with a single token and relationship number for the customer to any number of pre-designated financial institution customer accounts according to pre-defined transaction parameters.

BACKGROUND OF THE INVENTION

Currently, consumers use many different forms of payment in making purchases such as credit cards, debit cards, and home equity lines of credit, each with its own account number. The particular form of payment used depends, for example, on what is being purchased, and each form of payment typically requires a different type of presentment vehicle. For example, consumers often carry several different plastic credit cards, at least one plastic debit card for electronic withdrawals from a checking account, and special checks or a plastic credit card to draw on an equity line of credit. Carrying a large number of such presentment vehicles is cumbersome and inconvenient for the consumer.

SUMMARY OF THE INVENTION

Embodiments of the present invention provide methods and systems for routing and posting customer transactions performed with a single token and relationship number for the customer to any number of pre-designated financial institution customer accounts according to pre-defined transaction parameters.

Embodiments of the invention employ computer hardware and software, including, without limitation, instructions embodied in computer program code encoded on machine readable medium for execution in a processor and memory coupled to the processor, to provide methods and systems in which, for example, a financial institution, such as a bank, issues a single a relationship vehicle (e.g., a relationship presentment card) having a relationship number unique to a customer that is linked to a plurality of the customer's financial institution transaction accounts via pre-defined parameters for determining to which of the customer's accounts to post particular transactions with the relationship presentment card.

Thereafter, when the customer uses the relationship presentment card for a transaction, e.g., by swiping the card through a transaction terminal, such as a merchant POS terminal, the transaction is processed through card association processing channels back to the card issuing financial institution in the same manner as a typical credit card transaction. When the transaction data, including the relationship number, is received by the issuing financial institution, the particular financial institution account of the customer to which the transaction should be posted is identified according to the pre-defined parameters based on the transaction data, and the transaction is posted by the issuing financial institution to the identified financial institution account of the customer.

This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations that come within the scope of the invention.

Embodiments of the invention propose, for example, a concept utilizing a lifetime relationship presentment vehicle account number that takes advantage, for example, of a large number of businesses in which a financial institution, such as a bank, is typically engaged and links those businesses together in a single type of a relationship vehicle (e.g., a relationship presentment card). Depending on where and when a financial institution customer uses the relationship presentment card for embodiments of the invention, the card is swiped, for example, through a card reader of a transaction terminal, such as a POS terminal, and the transaction is processed through the association processing channels back to the card issuing bank in the same manner as a typical credit card transaction.

Figure 1:
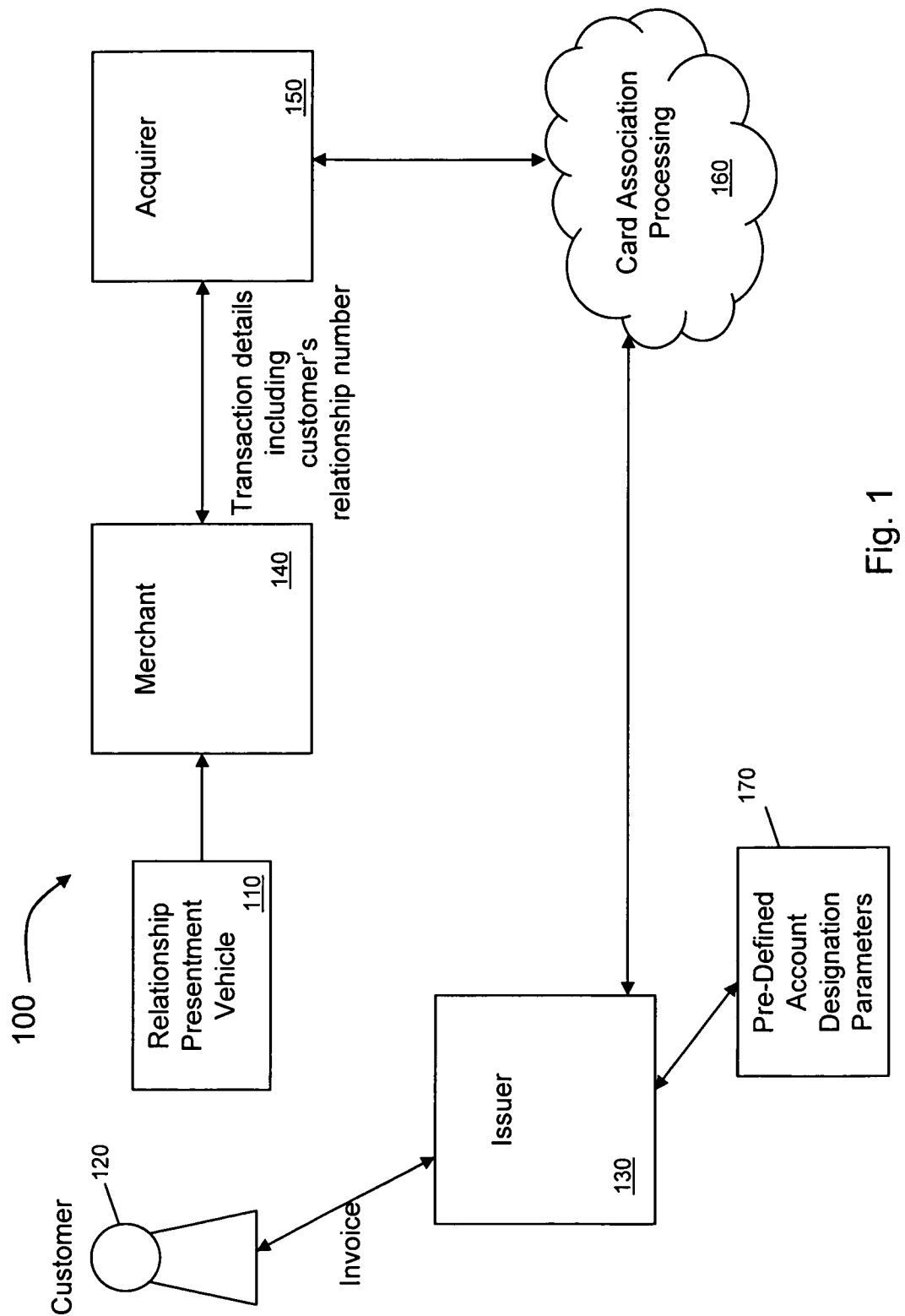
FIG. 1 is a schematic diagram that illustrates an overview example of key components and the flow of information between key components of the system for managing financial institution customer transaction accounts for embodiments of the invention.

FIG. 1 is a schematic diagram that illustrates an overview example of key components and the flow of information between key components of the system for managing financial institution customer transaction accounts for embodiments of the invention. Referring to FIG. 1, components of the system 100 for embodiments of the invention include, for example, a relationship presentment vehicle 110 issued to a customer 120 by an issuer 130 usable in transactions via a POS terminal or similar device (not illustrated) of a merchant 140. Other components include, for example, an acquirer 150 that processes the merchant's presentment vehicle authorizations and payments and forwards the data to the card association's processing system 160, which in turn communicates with the card issuer 130, and the issuer's processing platform 170 storing pre-defined account designation parameters.

It is to be understood that references herein to components, such as the issuer 130, the merchant 140, the acquirer 150, the card association's processing system 160, and the issuer's processing platform 170 include, without limitation, processors coupled to memory and to other processors likewise coupled to memory via computer networks, as well as computer program products stored in machine readable media and executing in such processors and memory.

According to embodiments of the invention, when the transaction data is received by the issuing financial institution 130, a determination as to which of the customer's accounts to post the transaction is made based, for example, on pre-defined parameters, such as where the transaction occurred (i.e., via location or merchants' identification information through the association or by the industry, etc.). Based, for example, on these and other pre-defined parameters related to matters, such as a dollar amount of the transaction or the type or types of accounts that the customer 120 may have, the transaction is then routed and posted any one of the accounts of the customer 120 under the financial institution's umbrella.

Figure 2:
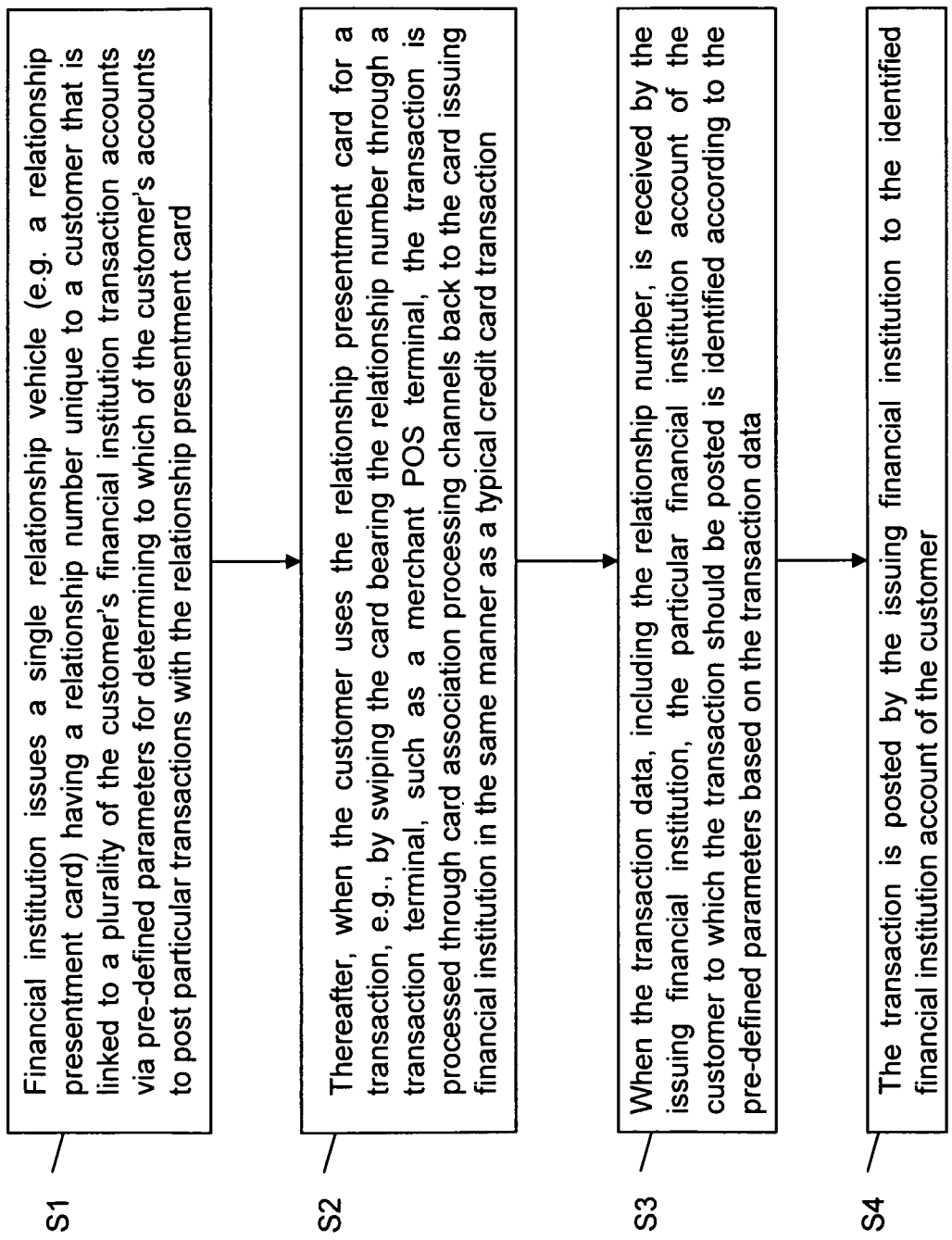
FIG. 2 is a flow chart that illustrates an example of the process of managing financial institution customer transaction accounts for embodiments of the invention.

FIG. 2 is a flow chart that illustrates an example of the process of managing financial institution customer transaction accounts for embodiments of the invention. The method is organized as a sequence of modules or steps in the flow chart. However, it is to be understood that these and modules associated with other methods described herein may be rendered for parallel execution or into different sequences of modules.

Referring to FIG. 2, at S1, the financial institution 130 issues a single relationship vehicle 110 (e.g. a relationship presentment card) having a relationship number unique to the customer 120 that is linked to a plurality of the customer's financial institution transaction accounts via pre-defined parameters for determining to which of the customer's accounts to post particular transactions with the relationship presentment card 110.

Referring further to FIG. 2, thereafter, at S2, when the customer 120 uses the relationship presentment card 110 for a transaction, e.g., by swiping the card bearing the relationship number through a transaction terminal of a merchant 140, such as a merchant's POS terminal, the transaction is processed via an acquirer 150 through card association processing channels 160 back to the card issuing financial institution 130 in the same manner as a typical credit card transaction.

Referring again to FIG. 2, at S3, when the transaction data, including the relationship number, is received by the issuing financial institution 130, the particular financial institution account of the customer 120 to which the transaction should be posted is identified according to the pre-defined parameters 170 based on the transaction data. At S4, the transaction is posted by the issuing financial institution 130 to the identified financial institution account of the customer 120.

For an example of the process for embodiments of the invention, a particular customer may elect to use his or her debit card product in all of the customer's grocery store transactions and his or her home equity line of credit for all transactions in excess of $1,000. Thus, when the customer's relationship presentment card 110 for embodiments of the invention is swiped at a terminal in connection with a particular transaction and the transaction is processed through the association processing channels 160 back to the bank 130, a determination is made according to the pre-defined parameters 170 to apply the transaction to the customer's debit card account if the transaction occurred at a grocery store or to apply the transaction to the customer's home equity line of credit if the transaction exceeded $1,000, for example, for a home improvement purchase.

For another example of the process for embodiments of the invention, the customer may elect to use his or her general purpose credit card account for "every-day" spending (i.e., non-grocery transactions below $1,000) except for transactions at a particular retail department store and to have such transactions post to the customer's account with the particular store. Accordingly, when the customer's relationship presentment card 110 for embodiments of the invention is swiped at a terminal in connection with a transaction at the particular department store and the transaction is processed through the association processing channels 160 back to the bank 130, a determination is made according to the pre-defined parameters 170 to apply the transaction to the customer's department store account.

It is to be understood that, according to embodiments of the invention, the parameters for determining to which of the customer's accounts to post particular transactions may be pre-defined by either or both of the customer 120 and the financial institution 130. It is to be further understood that the parameters mentioned in the foregoing examples are illustrative only and that the pre-defined parameters 170 for embodiments of the invention include any and all suitable parameters and any suitable combination or combinations of such parameters for determining the appropriate customer's account to which to post a particular transaction.

A key aspect of embodiments of the invention is a financial institution relationship designation, such as a numeric, alphanumeric, or alphabetical designation (referred to herein as the relationship number) on a token, such as a plastic relationship card 110 that remains with the customer throughout the lifetime of the customer's relationship with the financial institution 130. While the physical accounts which the customer 120 has with the financial institution 130 may be changed and modified from time-to-time as the customer's relationship with the financial institution 130 grows over time, the relationship number remains the same.

In embodiments of the invention, a customer's transaction with the customer's relationship presentment card 110 bearing the customer's relationship number is processed through the association processing channels, such as the MASTERCARD® or VISA® processing networks 160, back to the card issuing bank 130 in the same manner as a typical credit card transaction. Thereupon, a determination as to which of the customer's accounts to post the transaction is made based on pre-defined parameters 170, such as the merchant or industry category of the transaction, the type or types of goods or services associated with the transaction, the transaction amount, the location of the transaction, and/or the type or types of accounts which the customer has with the financial institution.

Embodiments of the invention involve a rewards aspect in which, for example, rewards points are posted or awarded exclusively to the financial institution account of the customer 120 to which a particular transaction with the customer's relationship presentment card 110 is posted. In another rewards aspect for embodiments of the invention, rewards points are posted or awarded to a single rewards account associated with the customer's relationship number regardless of the particular financial institution account of the customer to which the transaction is posted.

In a further rewards aspect for embodiments of the invention, assume that one of the customer's accounts with the financial institution 130 is an affinity credit card account that awards affinity reward points, such as airline frequent flier miles, to his or her account corresponding to amounts charged to the account. Assume further that at some point, the customer 120 decides that he or she has enough affinity reward points credited to the particular account and does not wish to have further affinity reward points credited to the account. In this rewards aspect, the customer 120 can elect the account to which reward points for a transaction is to be posted, regardless of the particular financial institution account to which transaction amount itself is to be posted.

In a billing aspect of embodiments of the invention, the customer's financial institution accounts are each invoiced to the customer 120 separately or in a combined statement, at the option of the customer 120. In other words, while the customer 120 has the convenience of a single relationship access vehicle which relieves him or her of the necessity of carrying around and keeping up with numerous payment vehicles on the front end, the customer 120 has the option of receiving separate invoices for each financial institution account or a single combined invoice for all accounts on the back end.

The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:

providing a non-programmable relationship presentment card to a customer having a plurality of financial institution transaction accounts, the relationship presentment card having a relationship identifier unique to the customer that remains with the customer throughout a lifetime of the customer's relationship with the financial institution, and the relationship presentment card storing only the unique relationship identifier and storing no data for any of said customer's plurality of financial institution transaction accounts;

linking, by a financial institution platform computer having a processor coupled to memory, the unique relationship identifier of the non-programmable relationship presentment card that remains with the customer throughout the lifetime of the customer's relationship with the financial institution to said plurality of the customer's transaction accounts with the financial institution for all transactions via a determination made exclusively by the customer in advance at the time the relationship presentment card is linked based exclusively on transaction data comprising at least one of a merchant category or an industry category for each transaction and without a determination at any time of customer-preferred benefits or customer-ranked preferred benefits, for all transactions with the relationship presentment card, to which one of the plurality of customer's linked accounts to post each transaction with the relationship presentment card, wherein the financial institution and the customer are two different entities, said unique relationship identifier of the non-programmable relationship presentment card remaining with the customer throughout the lifetime of the customer's relationship with the financial institution regardless of changes or modifications in any of said plurality of the customer's linked transaction accounts with the financial institution;

receiving, by the financial institution platform computer, data for a transaction entered at a merchant's transaction terminal having a card reader through which the relationship presentment card is swiped in connection with a transaction, the transaction data consisting at least in part of the unique relationship identifier and being received via a merchant acquirer and a card association processing network;

identifying, by the financial institution platform computer, a particular account of the customer with the financial institution to which the unique relationship identifier is linked and to which the transaction should be posted based on a total dollar amount of the transaction without requiring a selection by the customer at the time of the transaction of the particular financial institution account to which the transaction should be posted;

posting, by the financial institution platform computer, the transaction exclusively to the identified financial institution account of the customer;

posting, by the financial institution platform computer, a reward in connection with the transaction exclusively to a rewards account associated with the non-programmable relationship presentment card and not to the same financial institution account of the customer to which the transaction with the customer's relationship presentment card is posted; and communicating, by the financial institution platform computer, a statement to the customer, the statement comprising an invoice for the transaction with the identified financial institution account and an invoice for transactions with each of the plurality of financial institution transaction accounts.

2. The method of claim 1, wherein providing the relationship presentment card having the unique relationship identifier further comprises issuing the relationship presentment card having a permanent relationship presentment card account identifier unique to the customer that is a numeric, alphanumeric, or alphabetical identifier on the relationship presentment card.

3. The method of claim 1, wherein linking the relationship presentment card to the plurality of the customer's financial institution transaction accounts via the determination by the customer further comprises linking the relationship presentment card to the plurality of the customer's financial institution transaction accounts via the determination by the customer based on the merchant category of the transaction.

4. The method of claim 1, wherein linking the relationship presentment card to the plurality of the customer's financial institution transaction accounts via the determination by the customer further comprises linking the relationship presentment card to the plurality of the customer's financial institution transaction accounts via the determination by the customer based on the industry category of the transaction.

5. The method of claim 1, wherein receiving data for the transaction entered at the merchant's transaction terminal further comprises receiving data for the transaction entered at a point of sale terminal of the merchant.

6. The method of claim 1, wherein receiving the data by the processing platform of the financial institution via the merchant acquirer and the card association processing network further comprises receiving the data by the processing platform of the financial institution via the merchant acquirer and card association processing network after processing of the data in the card association network according to pre-defined card association processing procedures.

7. The method of claim 1, further comprising invoicing the customer's financial institution accounts to the customer separately or in a combined statement, at the option of the customer.

8. A system, comprising:
a non-programmable relationship presentment card for a customer having a plurality of financial institution transaction accounts, the relationship presentment card having a relationship identifier unique to the customer that remains with the customer throughout a lifetime of the customer's relationship with the financial institution, and the relationship presentment card storing only the unique relationship identifier and storing no data for any of said customer's financial institution transaction accounts;
a financial institution platform computer having a processor coupled to memory, the processor being programmed to:
link the unique relationship identifier of the non-programmable relationship presentment card that remains with the customer throughout the lifetime of the customer's relationship with the financial institution to said plurality of the customer's transaction accounts with the financial institution for all transactions via a determination made exclusively by the customer in advance, at the time the relationship presentment card is linked based exclusively on transaction data comprising at least one of a merchant category or an industry category for each transaction and without a determination of customer-preferred benefits or customer-ranked preferred benefits, for all transactions with the relationship presentment card, of which one of the plurality of customer's linked accounts to post each transaction with the relationship presentment card, wherein the financial institution and the customer are two different entities, said unique relationship identifier of the non-programmable relationship presentment card remaining with the customer throughout the lifetime of the customer's relationship with the financial institution regardless of changes or modifications in any of said plurality of the customer's linked transaction accounts with the financial institution;
receive data for a transaction entered at a merchant's transaction terminal having a card reader through which the relationship presentment card is swiped in connection with a transaction, the transaction data consisting at least in part of the unique relationship identifier and being received via a merchant acquirer and a card association processing network;
identify a particular account of the customer with the financial institution to which the unique relationship identifier is linked and to which the transaction should be posted based on a total dollar amount of the transaction without requiring a selection by the customer at the time of the transaction of the particular financial institution account to which the transaction should be posted;
post the transaction exclusively to the identified financial institution account of the customer;
post a reward in connection with the transaction exclusively to a rewards account associated with the non-programmable relationship presentment card and not to the same financial institution account of the customer to which the transaction with the customer's relationship presentment card is posted; and
communicate a statement to the customer, the statement comprising an invoice for the transaction with the identified financial institution account and an invoice for transactions with each of the plurality of financial institution transaction accounts.

\* \* \* \* \*